June 23, 1953  A. S. HILL ET AL  2,642,840
STOCK RESTRAINING GATE

Filed Dec. 28, 1950  2 Sheets-Sheet 1

ALBERT S. HILL
RICHARD H. HILL
INVENTORS

ATTORNEY

June 23, 1953  A. S. HILL ET AL  2,642,840
STOCK RESTRAINING GATE
Filed Dec. 28, 1950  2 Sheets-Sheet 2

ALBERT S. HILL
RICHARD H. HILL
INVENTORS.

ATTORNEY

Patented June 23, 1953

2,642,840

UNITED STATES PATENT OFFICE 2,642,840

STOCK RESTRAINING GATE

Albert S. Hill and Richard H. Hill, Caddo, Okla.

Application December 28, 1950, Serial No. 203,074

7 Claims. (Cl. 119—98)

This invention relates to animal holding devices and more particularly to such devices which may be readily mounted on spaced supports.

It is an object of the invention to provide an animal holder for restraining the movement of an animal during treatment of the animal.

It is another object of the invention to provide an animal holder of simple but rugged construction.

It is still another object of the invention to provide an animal holder which is easily operated by a single operator and which will hold the animal securely for an indefinite period of time once the animal is placed in the holder.

It is a still further object of the invention to provide an animal holder which can be easily secured to a pair of spaced supports, such as posts.

Other features and advantages of the invention will be hereinafter described and claimed.

In the drawings, which illustrate a practical embodiment of the invention:

Figure 1 is a front elevation of the animal holder with portions of the posts to which the holder is secured removed to show more clearly the operating elements of the holder, the operative elements being shown in open positions;

Figure 2 is a side elevation of the holder shown in Figure 1;

Figure 3:
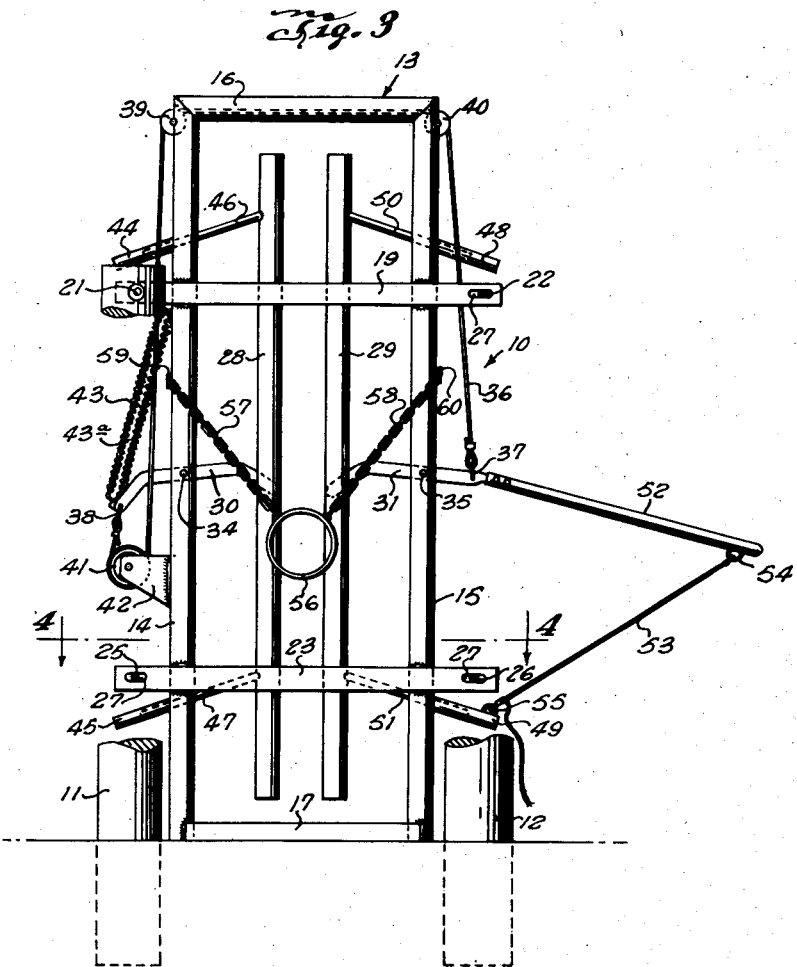
Figure 3 is a front plan view of the holder with the operative elements being shown in closed positions.
Figure 4:
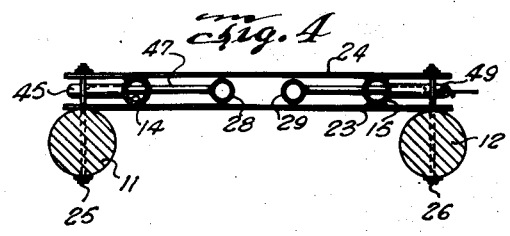
Figure 4 is a sectional view taken on the line 4—4 of Figure 3.

In the drawing, the numeral 10 designates generally the animal holder which is secured to the spaced posts 11 and 12. The animal holder 10 comprises a substantially rectangular frame 13 having a pair of vertical cylindrical members 14 and 15 which are connected at their upper ends by a top cross member 16 and at their lower ends by a pair of bottom cross members 17 and 18 disposed on opposite sides of the vertical members 11 and 12. The various components of the frame 10 are rigidly secured to one another by welding or in any other conventional manner.

The frame 10 is secured to the posts 12 and 11 by means of two pairs of spaced cross members. The upper cross members 19 and 20 are disposed on opposite sides of the vertical members 14 and 15 and are secured to posts 11 and 12 by bolts 21 and 22, respectively, which extend through registering apertures in the ends of the upper cross members and in the posts. The lower cross members 23 and 24 are similarly disposed on opposite sides of the vertical members 14 and 15 and are secured to posts 11 and 12 by bolts 25 and 26, respectively, which extend through registering apertures in the ends of the lower cross members and in the posts. The upper and lower cross members are rigidly secured to vertical members 14 and 15 of the frame 10 by welding or in any other conventional manner.

It will be apparent that the frame 13 is of very strong and rigid construction since the various cross members serve to hold the vertical members 14 and 15 together and restrain movement of the vertical members relative to one another. It will also be apparent that the frame 13 can be quickly attached and detached from the posts 11 and 12 since it is secured to them by bolts. The apertures 27 in the upper and lower cross members are elongated in order that the bolts may pass readily therethrough even if the bolts are not precisely aligned with respect to the apertures.

A pair of vertical jaws 28 and 29 are mounted between the upper cross members 19 and 20 and also between lower cross members 23 and 24 for movement toward and away from each other by means of levers 30 and 31, respectively. The levers 30 and 31 have inner ends pivotally secured to the jaws 28 and 29 by means of bolts 32 and 33, respectively, and are pivotally secured to the vertical members 14 and 15 of frame 13 at points intermediate their ends by means of bolts 34 and 35, respectively. The vertical members 14 and 15 and the jaws 28 and 29 are provided with suitable slots through which the levers 30 and 31 extend.

It will be apparent that as the outer ends of the levers 30 and 31, which are remote from the jaws, are pivoted downwardly about bolts 34 and 35, the jaws are moved toward each other and are also moved upwardly since the inner ends of the levers necessarily swing up during such pivotal movement of the levers. In order that the jaws 28 and 29 may be moved simultaneously toward and away from each other upon pivotal movement of the lever 31, a flexible member 36, such as steel cable, has one end secured to the outer end of the lever 31 by means of the ring 37, its opposite end secured to the outer end of lever 30 by means of the ring 38. Flexible member 36 passes over pulleys 39 and 40 secured in suitable openings in the upper portions of the vertical members 14 and 15 and through the top cross member 16 which is cylindrical in shape. The flexible member also passes over a direction changing pulley 41 mounted on the vertical member 14 below the lever 30 by means of a bracket 42 rigidly secured to the vertical member 14 by welding. The outer end of the lever 30 is biased upwardly by a pair of springs 43 and 43a which have opposite ends secured to the outer end of the lever 30 and to the vertical member 14 at a point below and adjacent the upper cross members 19 and 20. As the outer end of lever 31 is moved downwardly, the flexible member will simultaneously pull down the outer end of lever 30 against the resistance of the springs 42 and 43. When the outer end of the lever 31 is moved upwardly, the springs 42 and 43 will pull up the outer end of the lever 30 so that the jaws 28 and 29 will always be moved simultaneously. The weight of the jaws will tend to move the jaws to the open positions illustrated in Figure 1 but the springs are provided to make certain that any frictional forces in the pulleys and the flexible member will not prevent the movement of jaw 28 to its open position upon the movement of jaw 29 to its open position.

A pair of spaced hollow guides 44 and 45 extend downwardly and outwardly from the vertical member 14 and receive rods 46 and 47, respectively, which extend downwardly and outwardly from the jaw 28 and pass through suitable apertures in the vertical member 14 into the hollow guides. The guides and the rods are rigidly secured to the vertical member 14 and the jaw 28, respectively, by welding brazing or in any other conventional manner. The rods fit loosely and slidably in the guides and serve in cooperation with the guides to provide additional support for jaw 28, when it is in motion as well as when it is stationary, and to guide the movement of the jaw. It will be noted that the upper and lower pairs of cross members also serve to guide the movement of the jaw 28 since it lies between the cross members of each pair. The jaw 29 is similarly supported and guided by a pair of hollow guides 48 and 49 which extend downwardly and outwardly from jaw 29 and pass through suitable apertures in the vertical member 15 and into the hollow guides.

Since considerable force must sometimes be exerted on lever 31 in order that the jaws 28 and 29 be brought toward each other to hold an animal's neck firmly therebetween, a long handle 52 is attached to the outer end of the lever 31. A flexible member 53 is tied to ring 54 secured to the end of handle 52 and is of sufficient length to pass through the ring 55 secured to the hollow guide 49 of vertical member 15.

In use, the animal to be held is so placed that its neck extends between the jaws 28 and 29. The end of the flexible member 53 is then passed through the ring 55 and is pulled upwardly pivoting downwardly the handle 52 and the lever 31. Due to the flexible member 36, the lever 30 is simultaneously pivoted and the jaws 28 and 29 are moved inwardly into contact with opposite sides of the animal's neck. The handle 52 is depressed to an extent necessary to apply a desired amount of pressure on the animal's neck to hold it securely between the jaws. The end of the flexible member 53 which was slipped through the ring 54 is then tied, as shown in Figure 3, to keep the handle 52 in the depressed position. The operator of the device will then be free to dehorn the animal or perform any other desired operation on the animal. The ring 56 suspended between the jaws by the chains 57 and 58 may be fitted over the animal's snout to hold the animal's head in any desired position. The chains 57 and 58 are detachably fastened to the vertical members 14 and 15, respectively by means of hooks 59 and 69, respectively, over which can be slipped the links of the chains. The position of the ring 56 with respect to the jaws 28 and 29 can be changed by changing the links of the chains which are slipped over the hooks. After the animal has been treated, the flexible member 53 is untied and the handle 52 is moved upwardly to move the jaw 29 to open position. The springs 42a and 43 will simultaneously move the jaw 28 to outward position and the animal will be free to move away from the device.

Among the advantages of the described invention are its simplicity and ease of construction, strength, ease of operation, and the powerful grip which can be exerted on an animal's neck by the jaws.

The preferred embodiment of the invention obviously can be modified without departing from the invention and it is intended in the appended claims to cover modifications which do not depart from the spirit and scope of the invention.

What is claimed is:

1. An animal holder comprising a pair of vertical members, each having a pulley at its upper end, a pair of vertical jaws disposed between said vertical members for movement toward and away from one another; a first lever pivotally mounted on one of said vertical members and having an inner end operatively connected to one of said jaws; a second lever pivotally mounted on the other of said vertical members and having an inner end operatively connected to the other of said jaws, said first and second levers having outer ends; a flexible member connecting said outer ends and operable on the pulleys of said vertical member for causing simultaneous inward movement of said jaws in relative parallelism upon pivotal movement of one of said levers; a downwardly and outwardly extending hollow guide member on each of said vertical members; a downwardly and outwardly extending support member on each of said jaws slidingly telescoped in the guide member of an adjacent vertical member; and means operatively associated with one of said levers for maintaining the other end of said one of said levers in a downwardly pivoted position.

2. An animal holder comprising: a frame having a pair of spaced vertical members and a top cross member connecting said vertical members; a pair of vertical jaws between said vertical members; a first lever pivotally mounted on one of said vertical members and having an inner end operatively connected to the jaw adjacent said one of said vertical members; a second lever pivotally mounted on the other of said vertical members and having an inner end operatively connected to the jaw adjacent said other of said vertical members, said levers having outer ends; a flexible member; and a plurality of pulleys on said frame, said flexible member extending over said pulleys and having ends connected to said outer ends of said levers for causing simultaneous inward movement of said jaws upon pivotal movement of one of said levers.

3. An animal holder comprising: a frame having a pair of spaced vertical members and a top hollow cross member connecting said vertical members; a vertical jaw adjacent each of said vertical members; a first lever pivotally mounted on one of said vertical members and having an inner end operatively connected to the jaw adjacent said one of said vertical members; a second lever pivotally mounted on the other of said vertical members and having an inner end operatively connected to the jaw adjacent the other of said vertical members, said levers having outer ends; a flexible member; and a plurality of pulleys on said frame, said flexible member extending over said pulleys and through said top hollow cross member, said flexible member having ends connected to said outer ends of said levers for causing simultaneous movement of said jaws in relative parallelism upon pivotal movement of one of said levers.

4. An animal holder comprising: a frame having a pair of spaced vertical members and a top hollow cross member connecting said vertical members; a pulley mounted at each end of said cross-member, a pair of vertical jaws between said vertical members; a first lever pivotally mounted on one of said vertical members and having an inner end operatively connected to the jaw adjacent said one of said vertical members; a second lever pivotally mounted on the other of said vertical members and having an inner end operatively connected to the jaw adjacent said other of said vertical members, said levers having outer ends; and a cable connected at its ends to the outer ends of said levers and operable over said pulleys through said hollow cross member for causing simultaneous inward movement of said jaws in relative parallelism upon pivotal movement of one of said levers.

5. An animal holder comprising: a frame having a pair of spaced vertical members and a top cross member connecting said vertical members; a pulley at each end of said cross-member, a pair of vertical jaws between said vertical members and movable toward and away from each other in relative parallelism, a first lever pivotally mounted on one of said vertical members and having an inner end operatively connected to the jaw adjacent said one of said vertical members; a second lever pivotally mounted on the other of said vertical members and having an inner end operatively connected to the jaw adjacent said other of said vertical members, said levers having outer ends; a cable connected at its ends to the outer ends of said levers and operable over said pulleys for causing simultaneous inward movement of said jaws upon pivotal movement of one of said levers; and a pair of cross members extending from vertical member to vertical member and rigidly secured to opposite sides of said vertical members, said jaws being disposed between said cross members.

6. An animal holder comprising: a pair of spaced vertical members; a pulley at the upper end of each of said vertical members, a pair of vertical jaws disposed between said vertical members; and adapted to be moved toward and away from each other in relative parallelism; a first lever pivotally mounted at a point intermediate its ends on one of said vertical members, said first lever having an inner end operatively connected to the jaw adjacent said one of said vertical members at a point intermediate the ends of said last mentioned jaw; a second lever pivotally mounted at a point intermediate its ends on the other of said vertical members, said second lever having an inner end operatively connected to the jaw adjacent said other of said vertical members at a point intermediate the ends of said last mentioned jaw; a cable connected at one end to the outer end of one of said levers and at its opposite end to the outer end of the other of said levers and means at the upper ends of said pair of vertical members over which said cable is operable for causing simultaneous movement of said jaws upon pivotal movement of one of said levers.

7. An animal holder comprising: a pair of spaced vertical members; a pair of vertical jaws disposed between said vertical members; a first lever pivotally mounted at a point intermediate its ends on one of said vertical members, said first lever having an inner end operatively connected to the jaw adjacent said one of said vertical members at a point intermediate the ends of said last mentioned jaw; a second lever pivotally mounted at a point intermediate its ends on the other of said vertical members, said second lever having an inner end operatively connected to the jaw adjacent said other of said vertical members at a point intermediate the ends of said last mentioned jaw; and a flexible member operable over pulleys mounted in the upper ends of said vertical members and having its ends connected to the outer ends of said levers for causing simultaneous movement of said jaws in relative parallelism upon pivotal movement of one of said levers.

ALBERT S. HILL.
RICHARD H. HILL.

References Cited in the file of this patent

UNITED STATES PATENTS

| Number | Name | Date |
| --- | --- | --- |
| 1,799,073 | Thompson | Mar. 31, 1931 |
| 2,148,551 | Haigh | Feb. 28, 1939 |
| 2,234,366 | Carter | Mar. 11, 1941 |
| 2,571,487 | Rolfe et al. | Oct. 16, 1951 |